United States Patent
Zhang et al.

(10) Patent No.: US 10,409,238 B2
(45) Date of Patent: Sep. 10, 2019

(54) SMART POWER SOCKET AND SMART HOME SYSTEM

(71) Applicant: Ze Chen, Wenzhou (CN)

(72) Inventors: Ye Zhang, Huizhou (CN); Meng Koo Chan, Singapore (SG); Ze Chen, Wenzhou (CN)

(73) Assignee: Ze Chen, Yueqing (CN)

( * ) Notice: Subject to any disclaimer, the term of this patent is extended or adjusted under 35 U.S.C. 154(b) by 203 days.

(21) Appl. No.: 15/222,939

(22) Filed: Jul. 28, 2016

(65) Prior Publication Data

US 2017/0033602 A1    Feb. 2, 2017

(30) Foreign Application Priority Data

Jul. 31, 2015    (CN) .......................... 2015 1 0466724

(51) Int. Cl.
*G05F 1/66*    (2006.01)
*G05B 15/02*    (2006.01)
*H02H 11/00*    (2006.01)
*H02J 3/14*    (2006.01)
*H02J 13/00*    (2006.01)

(52) U.S. Cl.
CPC ........... *G05B 15/02* (2013.01); *H02H 11/002* (2013.01); *H02J 13/0006* (2013.01); *H02J 2003/143* (2013.01); *Y02B 70/3266* (2013.01); *Y04S 20/242* (2013.01)

(58) Field of Classification Search
CPC ........................................................ G05F 1/66
See application file for complete search history.

(56) References Cited

U.S. PATENT DOCUMENTS

| | | | |
|---|---|---|---|
| 2004/0169590 A1* | 9/2004 | Haughawout | G08C 17/00 340/12.29 |
| 2011/0046792 A1* | 2/2011 | Imes | F24F 11/006 700/278 |
| 2011/0063126 A1* | 3/2011 | Kennedy | G01D 4/002 340/870.02 |
| 2013/0021120 A1 | 1/2013 | Chen et al. | |
| 2013/0038968 A1 | 2/2013 | Chen et al. | |
| 2016/0156225 A1* | 6/2016 | Yang | H02J 13/0006 307/31 |

FOREIGN PATENT DOCUMENTS

CN      201420795658.1 U    4/2015

* cited by examiner

*Primary Examiner* — Tejal Gami
(74) *Attorney, Agent, or Firm* — Mei & Mark LLP

(57) ABSTRACT

Smart power socket comprising an MCU, a power supply circuit connected to the MCU, a wireless module circuit, and a drive switch control circuit, where the power supply circuit is connected to a low voltage power line, the wireless module circuit is connected to an external control device by means of wireless communication, and the drive switch control circuit is controlled by the MCU to implement controlling of on and off states of the smart power socket. Further, a smart home system comprising a remote control terminal and the smart power socket, where the smart power socket constitutes a LAN and is connected to Internet by means of a smart home gateway, and the remote control terminal is connected to the smart power socket by means of Internet to implement remote controlling of a household appliance plugged into the smart power socket.

5 Claims, 6 Drawing Sheets

SMART POWER SOCKET AND SMART HOME SYSTEM

CROSS-REFERENCE AND RELATED APPLICATION

The subject application claims priority on Chinese patent application 201510466724.X filed on Jul. 31, 2015. The contents and subject matters of the Chinese priority application is incorporated herein by reference.

TECHNICAL FIELD

The present invention relates to a smart power socket having data processing and communicating functions, and also relates to a smart home system using the smart power socket.

BACKGROUND ART

A power socket is an essential domestic installation. For example, a ground fault circuit interrupter (GFCI) having a ground fault circuit interruption and protection function is one type of power sockets and is widely used in North American and South American countries and regions such as United States and Canada. U.S. Patent Application Publication Nos. 2013-021120A1 and 2013-038968A1 and Chinese Patent No. 201420795658.1 disclose the aforementioned GFCI socket having different structures.

Both the aforementioned GFCI and the general power socket have the following disadvantage: failing to implement intelligent operation, no possible intelligent management for an electrical apparatus using a socket, and failing to meet requirements for smart home.

SUMMARY OF THE INVENTION

The first technical problem be solved by the present invention is to provide a smart power socket to overcome the disadvantage of failing to implement intelligent operation in an existing power socket.

The second technical problem to be solved by the present invention is to provide a smart home system using the aforementioned smart power socket to overcome the disadvantage of failing to implement intelligent operation of a household appliance in an existing home system.

The technical solution adopted by the present invention to solve the first technical problem is as below: a smart power socket is constructed, comprising: an MCU, a power supply circuit connected to the MCU, a wireless module circuit, and a drive switch control circuit, wherein the power supply circuit is connected to a low voltage power line, the wireless module circuit is connected to an external control device by means of wireless communication, and the drive switch control circuit is controlled by the MCU to implement controlling of on and off states of the smart power socket.

The smart power socket of the present invention comprises a power line coupling circuit, a signal receiving circuit, a signal transmitting circuit, and a power line modulation-demodulation circuit, wherein the power line coupling circuit is connected to a power supply line to implement coupling of a control signal and a power signal, the signal receiving circuit and the signal transmitting circuit are respectively connected between the power line coupling circuit and the power line modulation-demodulation circuit to implement receiving and transmitting of the control signal, and the power line modulation-demodulation circuit is connected to the MCU to implement demodulating of the control signal and its transmitting to the MCU.

In the smart power socket of the present invention, the drive switch control circuit comprises a leakage grounding detection circuit, an application-specific leakage signal amplifying circuit, a power supply indicating circuit, a tripping actuator circuit, a power-up drive signal generating circuit, and an inverse connection detecting and executing circuit, where the application-specific leakage signal amplifying circuit, the power supply indicating circuit, the tripping actuator circuit, and the power-up drive signal generating circuit are respectively connected to the MCU, the leakage grounding detection circuit is connected between the low voltage power line and the application-specific leakage signal amplifying circuit, and the power-up drive signal generating circuit is connected to the inverse connection detecting and executing circuit and drives the circuit into action.

The smart power socket of the present invention comprises a manual detection circuit, wherein the manual detection circuit is connected to the MCU to implement manual detection of the smart power socket.

The technical solution adopted by the present invention to solve the second technical problem is as below: a smart home system is constructed, including: a remote control terminal and a smart power socket, wherein the smart power socket comprises an MCU, a power supply circuit connected to the MCU, a wireless module circuit, and a drive switch control circuit, where the wireless module circuit is connected to an external control device by means of wireless communication, and the drive switch control circuit is controlled by the MCU to implement controlling of on and off states of the smart power socket; and the smart power socket constitutes a LAN and is connected to Internet by means of a smart home gateway, and the remote control terminal is connected to the smart power socket by means of Internet to implement remote controlling of a household appliance plugged into the smart power socket.

In the smart home system of the present invention, the remote control terminal is a mobile control terminal or a personal computer.

In the smart home system of the present invention, the mobile control terminal is a smart mobile phone, a notebook computer or a mobile tablet computer.

Compared with the prior art, the smart power socket and the smart home system of the present invention have the following beneficial effects.

1. The controllable smart power socket is obtained by means of disposing an MCU, a power supply circuit, a wireless module circuit, and a drive switch control circuit on the socket, remote controlling of on and off states of the socket is implemented, and in this way, remote controlling of a household appliance using the smart power socket is implemented.

2. The smart power socket is used to construct a smart home LAN, and the remote control terminal implements controlling of the smart power socket by means of Internet, thereby implementing the remote controlling of the household appliance.

3. The smart home system takes full advantage of existing networks and smart devices for construction, thus being low in cost, reliable, safe and convenient for use.

DETAILED DESCRIPTION OF THE INVENTION AND EMBODIMENTS

The following description further describes the present invention with reference to the accompanying drawings and embodiments.

Smart Power Socket Embodiment I

Figure 1:
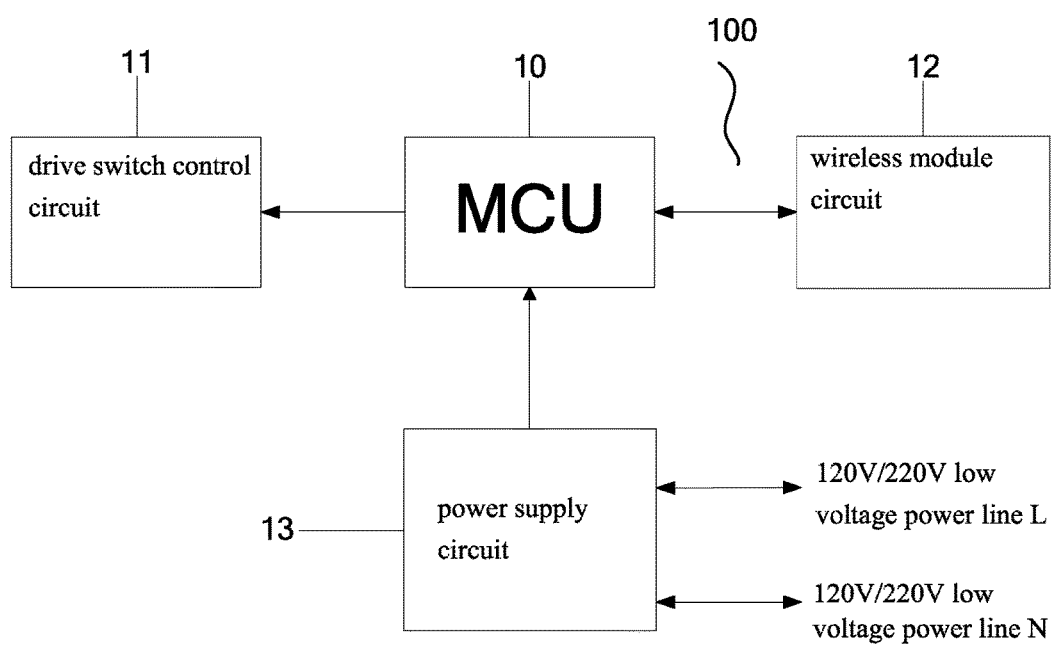
FIG. 1 is a functional block diagram of the smart power socket according to Embodiment I of the present invention.

As shown in FIG. 1, the smart power socket 100 of the present invention comprises an MCU 10, a power supply circuit 13 connected to the MCU 10, a wireless module circuit 12 and a drive switch control circuit 11, wherein the wireless module circuit 12 is connected to an external control device by means of wireless communication, and the drive switch control circuit 11 is controlled by the MCU 10 to implement controlling of on and off states of the smart power socket 100.

Smart Power Socket Embodiment II

Figure 2:
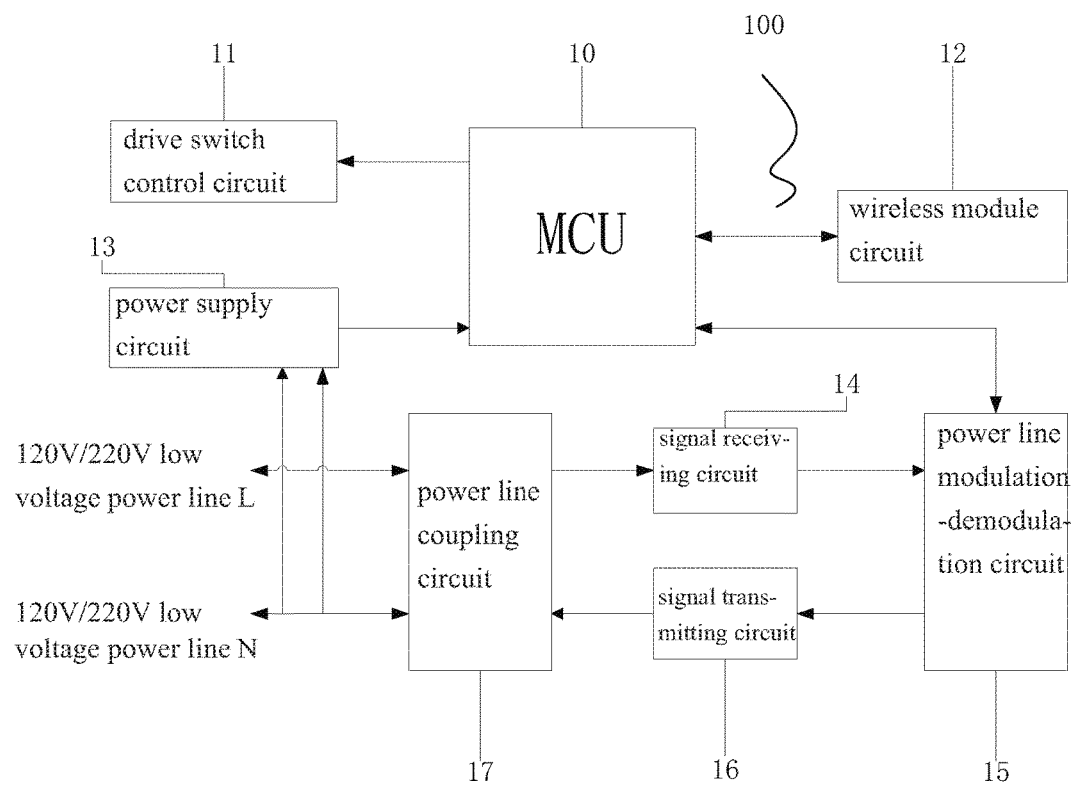
FIG. 2 is a functional block diagram of the smart power socket according to Embodiment II of the present invention.

As shown in FIG. 2, the smart power socket 100 of the present invention comprises the MCU 10, the power supply circuit 13, the wireless module circuit 12, the drive switch control circuit 11, a power line coupling circuit 17, a signal receiving circuit 14, a signal transmitting circuit 16, and a power line modulation-demodulation circuit 15.

The power supply circuit 13, the wireless module circuit 12, and the drive switch control circuit 11 are respectively connected to the MCU 10, the power supply circuit 13 is connected to a low voltage power line, the power line coupling circuit 17 is connected to a power supply line to implement coupling of a control signal and a power signal, the signal receiving circuit 14 and the signal transmitting circuit 16 are respectively connected between the power line coupling circuit 17 and the power line modulation-demodulation circuit 15 to implement receiving and transmitting of the control signal. The power line modulation-demodulation circuit 15 is connected to the MCU 10 to implement demodulating of the control signal and its transmitting to the MCU 10.

Figure 3:
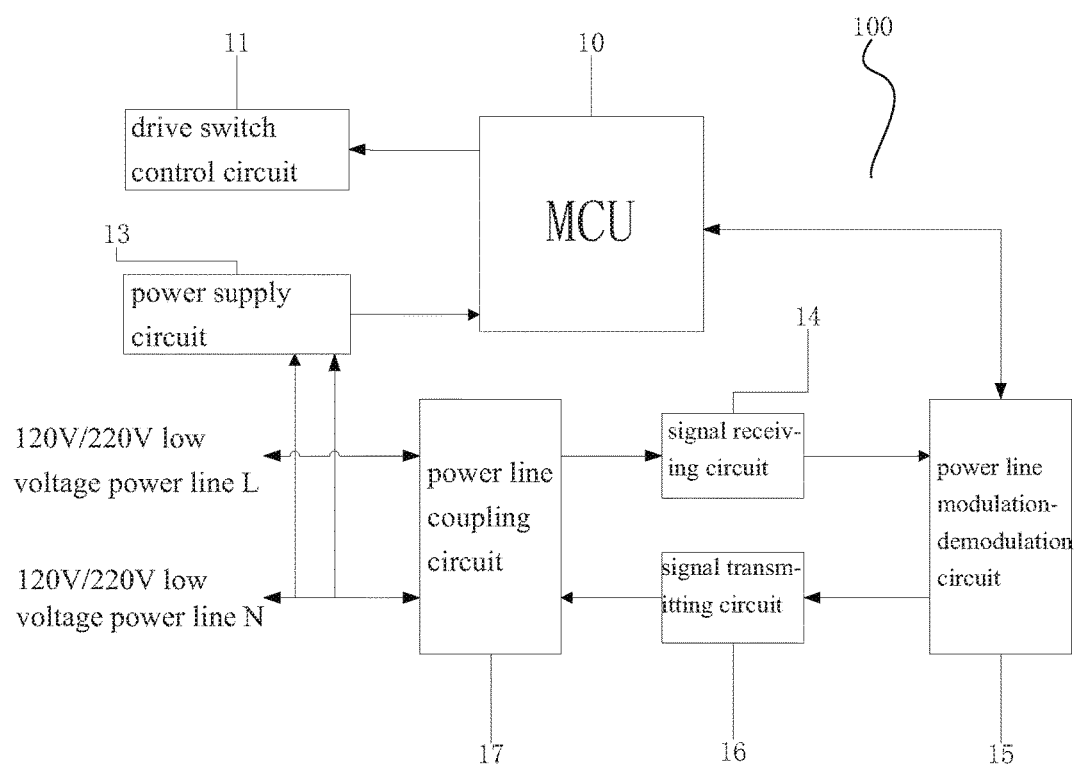
FIG. 3 is a functional block diagram of the smart power socket constituting the smart home system using the smart power socket according to Embodiment II of the present invention.

In a LAN, if a smart power socket adopts the structure as shown in FIG. 2, other smart power sockets adopt the structure as shown in FIG. 3, i.e., the structure is based on the structure as shown in FIG. 2, but the wireless module circuit 12 is removed. In a LAN, a control signal is transmitted among smart power sockets by means of a power line in the LAN, and modulation, transmission and extraction, and use of the control signal are implemented by means of the power line coupling circuit 17, the signal receiving circuit 14, the signal transmitting circuit 16 and the power line modulation-demodulation circuit 15.

Smart Power Socket Embodiment III

The smart power socket in this embodiment adopts a ground fault circuit interrupter (GFCI).

Figure 4:
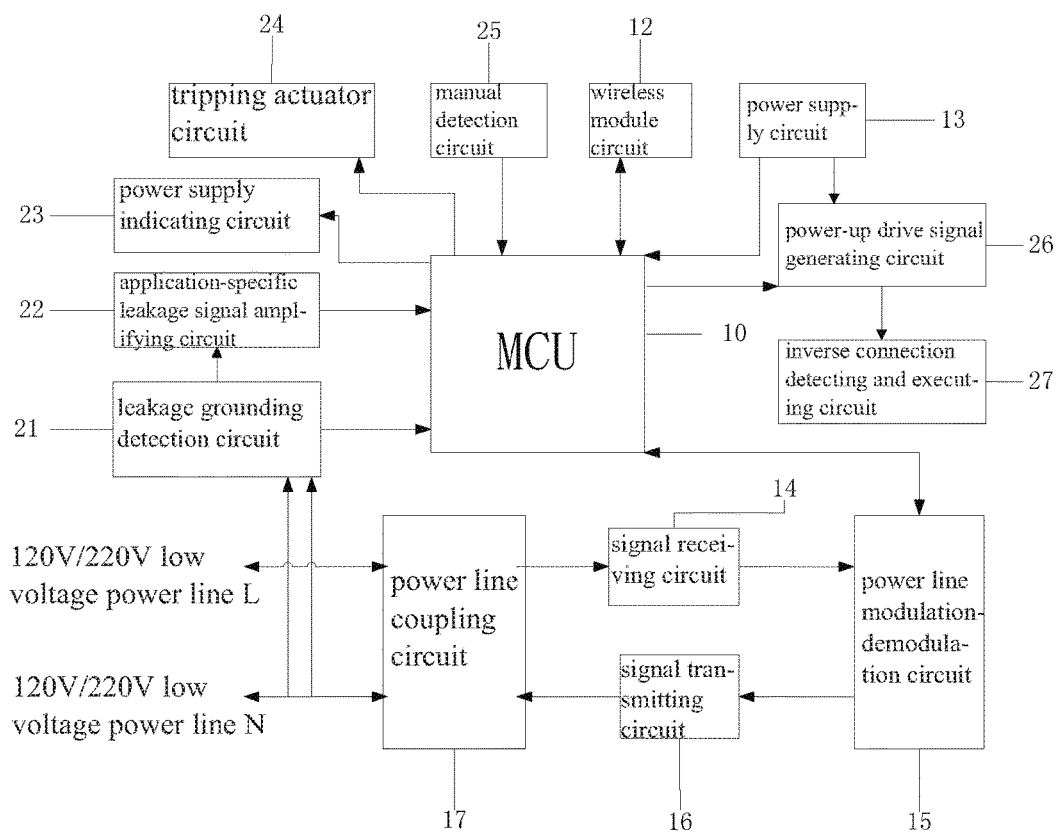
FIG. 4 is a functional block diagram of the smart power socket according to Embodiment III of the present invention.

As shown in FIG. 4, the smart power socket in this embodiment comprises the MCU 10, the power supply circuit 13, the wireless module circuit 12, the drive switch control circuit, the power line coupling circuit 17, the signal receiving circuit 14, the signal transmitting circuit 16, and the power line modulation-demodulation circuit 15.

The power supply circuit 13 and the wireless module circuit 12 are respectively connected to the MCU 10. The power line coupling circuit 17 is connected to a power supply line to implement coupling of a control signal and a power signal, the signal receiving circuit 14 and the signal transmitting circuit 16 are respectively connected between the power line coupling circuit 17 and the power line modulation-demodulation circuit 15 to implement receiving and transmitting of the control signal. The power line modulation-demodulation circuit 15 is connected to the MCU 10 to implement demodulating of the control signal and its transmitting to the MCU 10.

The drive switch control circuit comprises a leakage grounding detection circuit 21, an application-specific leakage signal amplifying circuit 22, a power supply indicating circuit 23, a tripping actuator circuit 24, a manual detection circuit 25, a power-up drive signal generating circuit 26, and an inverse connection detecting and executing circuit 27, wherein the application-specific leakage signal amplifying circuit 22, the power supply indicating circuit 23, the tripping actuator circuit 24 and the power-up drive signal generating circuit 26 are respectively connected to the MCU 10, the leakage grounding detection circuit 21 is connected between the low voltage power line and the application-specific leakage signal amplifying circuit 22. The power-up drive signal generating circuit 26 is connected to an inverse connection detecting and executing circuit 27 and drives the circuit into action.

The manual detection circuit 25 is connected to the MCU 10 to implement manual detection of short-circuit fault of the smart power socket 100.

In other embodiments, the manual detection circuit 25 is not provided, which does not affect the implementation of the objective of the present invention.

Smart Power Socket Embodiment IV

This embodiment is substantially the same as Embodiment III, and the difference is as below: the power line coupling circuit 17, the signal receiving circuit 14, the signal transmitting circuit 16, and the power line modulation-demodulation circuit 15 are not provided, which does not affect the implementation of the objective of the present invention.

Figure 5:
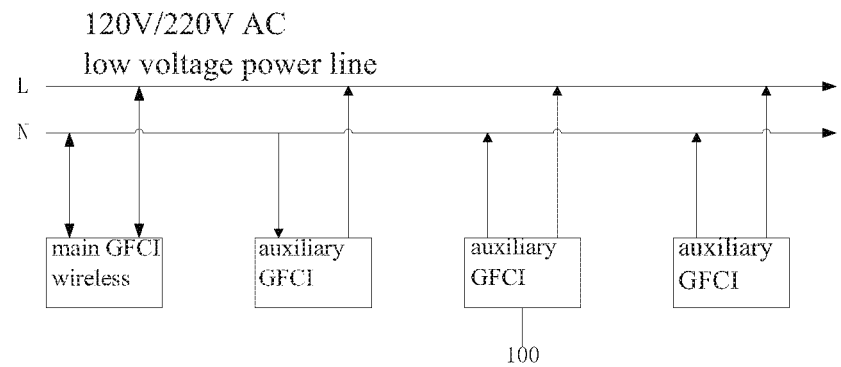
FIG. 5 is a general installation drawing of the smart power socket of the present invention.
Figure 6:
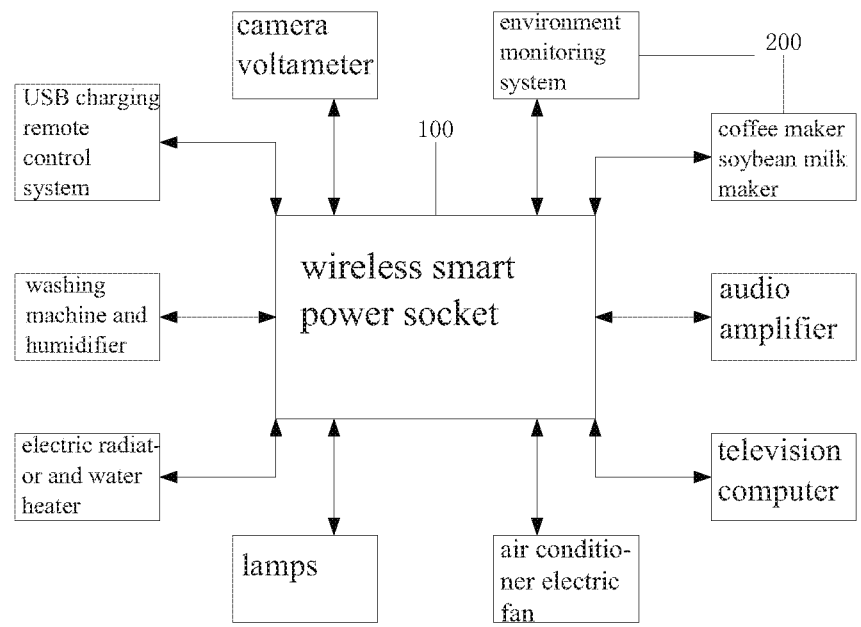
FIG. 6 is a schematic diagram applicable to applicable to using the smart power socket of the present invention.

As shown in FIG. 5 and FIG. 6, the smart power socket 100 of the present invention may be configured to supply power for household appliances 200.

Figure 7:
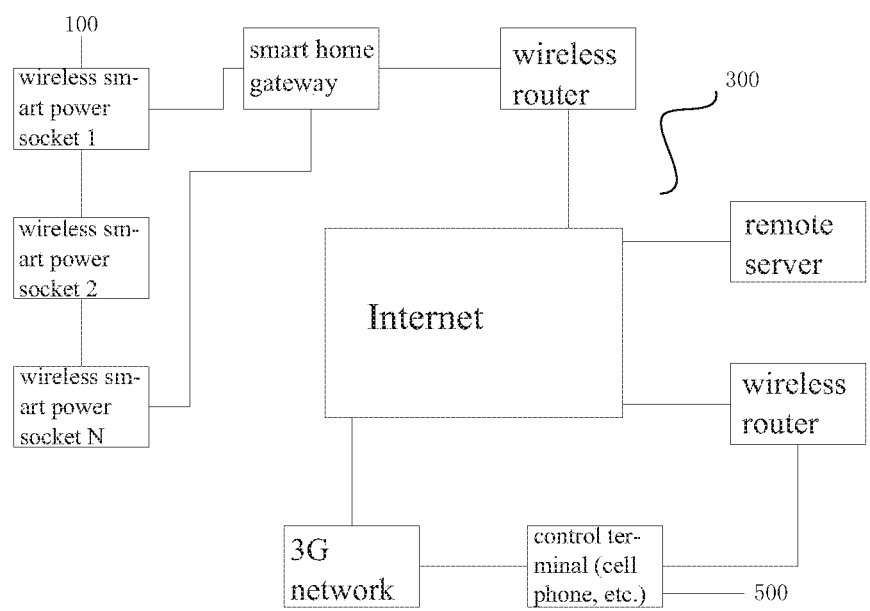
FIG. 7 is a functional block diagram of the smart home system according to an embodiment of the present invention.

As shown in FIG. 7, the smart home system of the present invention comprises a remote control terminal 500 and the smart power socket 100.

The smart power socket 100 is as mentioned above. The smart power socket 100 constitutes a LAN and is connected to Internet by means of a smart home gateway. The remote control terminal 500 is connected to the smart power socket 100 by means of Internet to implement remote controlling of a household appliance plugged into the smart power socket 100. The remote control terminal may be a mobile control terminal or a fixed personal computer (PC). The mobile control terminal comprises but is not limited to a smart mobile phone, a notebook computer or a mobile tablet computer and so on.

The remote control terminal 500 may control the on-off state of the smart power socket 100, or may write or modify an internal control procedure of the smart power socket 100 to implement controlling of a working state of the working state.

We claim:

1. A smart power socket, comprising,
an MCU,
a power supply circuit connected to the MCU,
a wireless module circuit, and
a drive switch control circuit,
wherein the power supply circuit is connected to a low voltage power line for delivering power to the power supply circuit, the wireless module circuit is connected to an external control device via wireless communication, and the drive switch control circuit is controlled by the MCU to implement controlling of on and off states of the smart power socket; and
wherein the drive switch control circuit comprises
a leakage grounding detection circuit,
an application-specific leakage signal amplifying circuit,
a power supply indicating circuit,
a tripping actuator circuit,
a power-up drive signal generating circuit, and
an inverse connection detecting and executing circuit, and
wherein the application-specific leakage signal amplifying circuit, the power supply indicating circuit, the tripping actuator circuit, and the power-up drive signal generating circuit are respectively connected to the MCU, the leakage grounding detection circuit is connected between the low voltage power line and the application-specific leakage signal amplifying circuit, and the power-up drive signal generating circuit is connected to the inverse connection detecting and executing circuit and drives the circuit into action.

2. The smart power socket of claim 1, further comprising a manual detection circuit,
wherein the manual detection circuit is connected to the MCU to implement manual detection of the smart power socket.

3. A smart home system, comprising
a remote control terminal, and
a smart power socket,
wherein the smart power socket comprises
an MCU,
a power supply circuit connected to the MCU,
a wireless module circuit, and
a drive switch control circuit,
wherein the power supply circuit is connected to a low voltage power line for delivering power to the power supply circuit, the wireless module circuit is connected to an external control device via wireless communication, and the drive switch control circuit is controlled by the MCU to implement controlling of on and off states of the smart power socket;
wherein the wireless module circuit is connected to an external control device by means of wireless communication, and the drive switch control circuit is controlled by the MCU to implement controlling of on and off states of the smart power socket; and
wherein the drive switch control circuit comprises,
a leakage grounding detection circuit,
an application-specific leakage signal amplifying circuit,
a power supply indicating circuit,
a tripping actuator circuit,
a power-up drive signal generating circuit,
an inverse connection detecting and executing circuit, and
wherein the application-specific leakage signal amplifying circuit, the power supply indicating circuit, the tripping actuator circuit, and the power-up drive signal generating circuit are respectively connected to the MCU, the leakage grounding detection circuit is connected between the low voltage power line and the application-specific leakage signal amplifying circuit, and the power-up drive signal generating circuit is connected to the inverse connection detecting and executing circuit and drives the circuit into action; and
the smart power socket constitutes a LAN and is connected to Internet by means of a smart home gateway, and the remote control terminal is connected to the smart power socket by means of Internet to implement remote controlling of a household appliance plugged into the smart power socket.

4. The smart home system of claim 3, wherein the remote control terminal is a mobile control terminal or a personal computer.

5. The smart home system of claim 4, wherein the mobile control terminal is a smart mobile phone, a notebook computer, or a mobile tablet computer.

* * * * *